United States Patent [19]
Ellis et al.

[11] 4,030,085
[45] June 14, 1977

[54] NONFERROMAGNETIC LINEAR VARIABLE DIFFERENTIAL TRANSFORMER

[75] Inventors: James F. Ellis, Powell; Peter L. Walstrom, Oak Ridge, both of Tenn.

[73] Assignee: The United States of America as represented by the United States Energy Research and Development Administration, Washington, D.C.

[22] Filed: July 20, 1976

[21] Appl. No.: 707,000

[52] U.S. Cl. .............................. 340/199; 176/23; 323/53
[51] Int. Cl.² ...................................... G08C 19/08
[58] Field of Search ............... 340/199, 198, 196; 323/53

[56] References Cited
UNITED STATES PATENTS

| | | | |
|---|---|---|---|
| 2,452,862 | 11/1948 | Neff | 340/199 |
| 2,503,851 | 4/1950 | Snow | 340/196 |
| 3,898,635 | 8/1975 | Kulterman | 340/196 |

FOREIGN PATENTS OR APPLICATIONS

| | | | |
|---|---|---|---|
| 238,252 | 12/1925 | United Kingdom | 340/199 |

*Primary Examiner*—Thomas B. Habecker
*Attorney, Agent, or Firm*—Dean E. Carlson; David S. Zachry; Louis M. Deckelmann

[57] ABSTRACT

A nonferromagnetic linear variable differential transformer for accurately measuring mechanical displacements in the presence of high magnetic fields is provided. The device utilizes a movable primary coil inside a fixed secondary coil that consists of two series-opposed windings. Operation is such that the secondary output voltage is maintained in phase (depending on polarity) with the primary voltage. The transducer is well-suited to long cable runs and is useful for measuring small displacements in the presence of high or alternating magnetic fields.

4 Claims, 3 Drawing Figures

4,030,085

NONFERROMAGNETIC LINEAR VARIABLE DIFFERENTIAL TRANSFORMER

BACKGROUND OF THE INVENTION

This invention was made in the course of, or under, a contract with the U.S. Energy Research and Development Administration.

Linear variable differential transformers (LVDT's) convert mechanical displacements to proportional electrical voltages. In prior devices, a ferromagnetic core moves axially, varying the coupling between an a.c. excited primary coil and two series-opposed secondary coils. Such LVDT's cannot be used in high magnetic fields because the core will saturate and become ineffecutal. Magnetically shielded LVDT's, although quite useful in low-intensity magnetic fields, also become disabled in high-intensity fields due to saturation of both their shields and cores. In lesser magnetic fields, especially those having significant gradients, partially magnetized ferromagnetic cores are introduce intolerable offsets and nonlinearities. It should be noted that the ambient magentic fields in which it is desired to operate the present invention are much stronger—by a thousand times or so—than those for which shielded LVDT's of the commercial variety are intended. A large number of displacement transducers are required for the testing of large superconducting coils to be used in devices for producing very hot plasmas and in devices that are being utilized in controlled thermonuclear fusion research. Such transducers must have the ease of operation and sensitivity of an LVDT, while at the same time be fully operable in the presence of large time-varying magnetic fields.

Thus, there exists a need for an LVDT that is capable of accurately measuring small mechanical displacements in an intense magnetic field environment. The present invention was conceived to meet this need in a manner to be described herein below.

SUMMARY OF THE INVENTION

It is the primary object of the present invention to provide an LVDT that is capable of accurately measuring small mechanical displacements in an intense magentic field environment.

It is another object of the present invention to provide an LVDT having a high output.

It is still another object of the present invention to provide an LVDT suited to long cable runs by correction of the phase-angle relationship between the input and output signals to minimize the inductive cross-coupling that long cables sometimes introduce.

The above objects have been accomplished in the present invention by providing an LVDT which is constructed in such a manner that all ferromagnetic material is eliminated therefrom, such that the output from the LVDT, when being utilized to measure a displacement in an intense magnetic field, is almost distortionless due to such elimination of ferromagnetic material, and also due to the near resonant operation of the primary and secondary coils of the LVDT unit, which is accomplished in a manner to be described herein below.

DESCRIPTION OF THE PREFERRED EMBODIMENT

Figure 1:
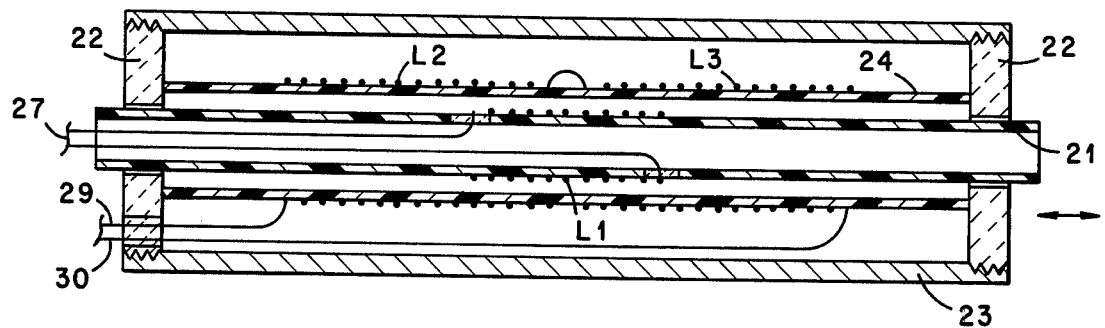
FIG. 1 is a cross-sectional view of the nonferromagnetic LVDT transducer of the present invention.

In FIG. 1, a slidable shaft 21 that is made of a non-magnetic insulator material, and which serves as a coil form for a primary coil L1, is axially movable between and through the holes in the ends of the non-magnetic end-plates 22 of a cylindrical non-magnetic housing 23. The housing 23 may be constructed from a metal, for example, and the end-plates 22 are made of non-magnetic insulator material, for example. Inside the housing 23, another coil form 24, called the secondary coil form which is also made of a nonmagnetic insulator material, axially surrounds the shaft 21 and is affixed at its ends to the two end plates 22. Two fixed secondary coils, L2 and L3, designated as the first secondary coil half and the second secondary coil half respectively, are wound series-opposed on the secondary coil form 24. Electrical leads 27, 29, and 30 out of the transducer connect to the coils L1, L2, and L3, respectively.

Figure 2:
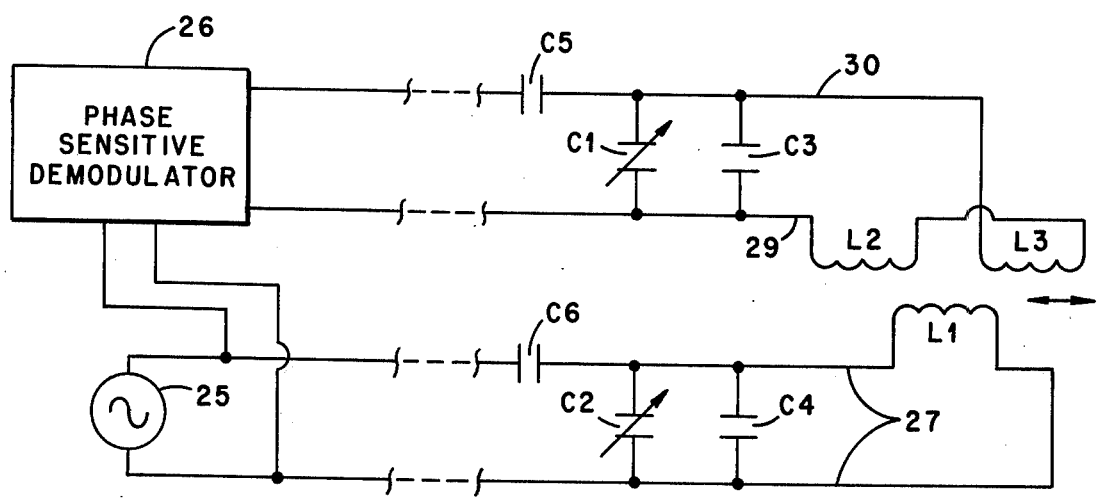
FIG. 2 is a schematic diagram of a detector system which may be utilized with the transducer of FIG. 1.

In FIG. 2, the primary coil L1 is connected via the leads 27 to an oscillator 25 that generates a fixed-frequency, constant-voltage signal. Capacitors C2 and C4 are used for fine and coarse tuning of coil L1 to resonance, and particularly to the precise point on the resonance curve where the voltage and current in the driven cable between oscillator 25 and capacitor C2 are exactly in phase. It is preferable to keep the major portion of the tuning capacitance (C4) near the transducer.

Coil L1 induces voltages in coils L2 and L3. When coil L1 is equally disposed between L2 and L3, no output appears on leads 29 and 30. Moving L1 in either direction along the axis unbalances the coupling between L1 and L2-L3 and results in an output proportional to the displacement that is detected by a phase-sensitive demodulator 26. At the center null position, the phase relationship between the primary and secondary coils changes abruptly by 180°. This abrupt change of polarity is detected by the demodulator and presented as a + or − signal from the center null.

Capacitors C1 and C3 are connected across the leads 29 and 30 and are used for fine and coarse tuning of the L2-L3 series combination to a resonant frequency slightly higher than the frequency of oscillator 25. This slight de-tuning causes the secondary output voltage to lead the phase angle it would have if tuned exactly to resonance and become either 0° or 180° (as the case may be) in relation to both the voltage and current in the primary coil L1. It should be understood that a single capacitor could be utilized for tuning the coil L1 and also another single capacitor could be utilized for tuning the coils L2-L3. However, it is preferred to use a respective pair of capacitors for these purposes. Rapidly changing external magnetic field gradients can induce unwanted voltages in the series-opposed coils. For this reason, capacitors C6 and C5 are connected in series with the excitation and signal leads, respectively. They serve as high-pass filters, coupling the high frequency carrier currents, but blocking the lower frequency currents induced by the time-varying ambient magnetic fields when such fields are present during an operation of the LVDT transducer.

It should be understood that the slidable shaft 21 of FIG. 1 is longer at its right end than that shown on the drawing and was so shown for the lack of space on the drawing. The extended portion, not shown, of the shaft 21 is adapted to be positioned against a large superconducting magnetic coil to detect any displacement thereof after the magnetic coil is energized, and the housing 23 of the LVDT transducer is held stationary by any conventional or convenient means such that any movement of the coil L1 with respect to the coils L2-L3 as a result of such displacement will provide an output signal indicative thereof as sensed by the demodulator 26. The above described device has a general utility for detecting mechanical displacements of any part and particularly when such a part is a magnetic field producing device, or is positioned in, or is under the influence of, a magnetic field.

Figure 3:
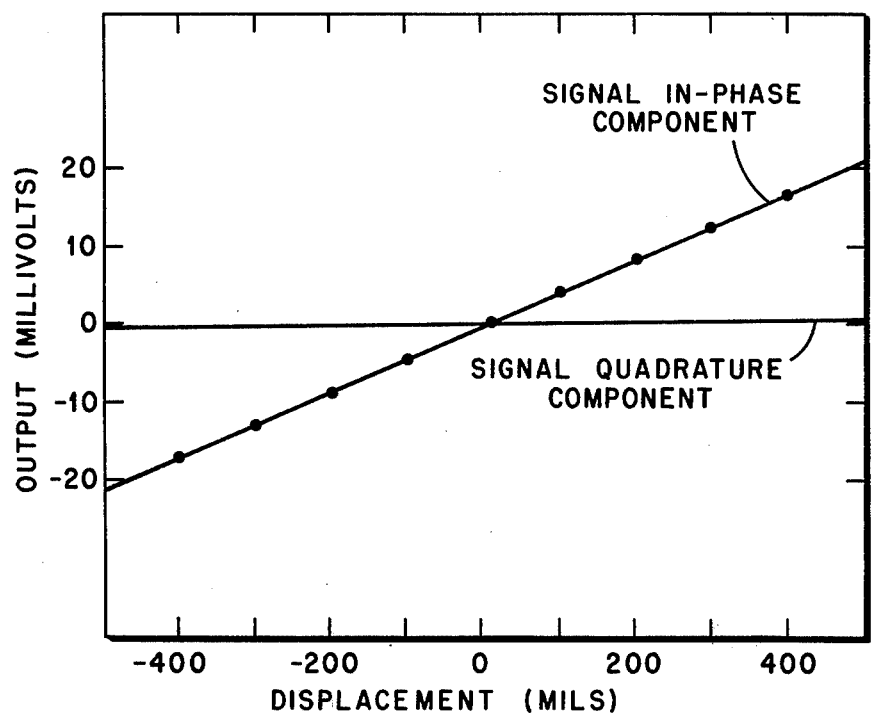
FIG. 3 is a graph showing the output of the transducer as a function of axial displacement.

FIG. 3 is a graph showing the output of the LVDT as a function of displacement. The signals "in-phase component" is virtually a straight line, having plus and minus values that are 20% of the input voltage at full gaging range. This is a high value considering the fact that the electromagnetic coupling between primary and secondary coils is not aided by any ferromagnetic materials. The high output is obtained by optimized coupling between the primary and secondary coils and resonant operation. The second curve shows that the "signal gradrature component" is virtually zero throughout the gaging range.

The output of the LVDT, described above, is almost distortless due to the elimination of all ferromagnetic material therefrom, and the near resonant operation of the primary and secondary coils. It is also virtually unaffected by outside magnetic fields because there is no magnetic core to becaome non-linear or saturated, or to cause a ferromagnetic type of modulation of the sensitivity of the LVDT. Direct induction by a changing external field is reduced or eliminated by use of the series-opposedsecondary coils. The non-magnetic metal housing is made thick enough to prevent eddy-current penetration at the operating frequency. The housing, therefore, serves as both a magnetic and and electrostatic shield for frequencies that would be demodulated by the phase sensitive demodulator. One important result of this is that it permits several units to be operated side-by-side without cross-talk.

The above-described device has inherent linearity due to the uniformity of a moving coil—the fact that the coil is uniform and moves (as opposed to a moving core). Conventional core types tend to become more non-linear as they get longer in length and must be force-fit into linearity by tapered windings, etc. The present device does not have this problem since it inherently becomes linear whenever it is long enough to overcome end-fringing effects. In fact, the longer it is, the better.

The unique features of the above-described LVDT transducer can be summarized as follows:
1. It is fully operable in a very high ambient magnetic field;
2. It is virtually unaffected by external variable magnetic field;
3. The primary voltage and current are maintained inphase;
4. The secondary output voltage is maintained in-phase (0-180°) with the primary voltage;
5. There is very low harmonic distortion;
6. The output is very high for an LVDT lacking a ferromagnetic core; and
7. Transducers can be carefully wound so as to achieve a linearity not found in prior art transducers.

The LVDT transducer described above is not necessarily limited to the structure shown in FIG. 1. For example, the coil form 24 may be made smaller in diameter and extend with a tight fit within the axial holes in the end plates 22, and the portion of the shaft 21 upon which the primary coil L1 is wound is then made smaller in diameter than the rest of shaft 21 such that when the coil L1 is wound on the now recessed portion of the shaft 21, the outer portion of the coil L1 will be less than flush with the outer surfaces of the rest of shaft 21. The diameter of the non-recessed portions of the shaft 21 are also reduced to the extent necessary to provide a close fit within the inside of the coil form 24 such that the inside of coil form 24 serves as a bearing for the non-recessed portions of the shaft 21. The electrical lead lines for the coil L1 are then connected to the coil through necessary slots and an axial hole drilled through one end of the shaft 21.

This invention has been described by way of illustration rather than by limitation and it should be apparent that it is equally applicable in fields other than those described.

What is claimed is:

1. A nonferromagnetic linear variable differential transformer system for measuring mechanical displacements in the presence of a high magnetic field, comprising a cylindrical non-magnetic housing, a pair of respective non-magnetic end plates mounted in the respective ends of said housing, said end plates being provided with respective axial apertures therein, a slidable shaft of a non-magnetic insulator material, said shaft adapted to be moved between and through said apertured end plates, a coil form of a non-magnetic insulator material mounted within said housing and affixed to said end plates, said coil form axially encompassing said slidable shaft, a primary coil wound about said shaft, a pair of secondary coils wound series-opposed about said coil form, an oscillator for providing a fixed-frequency, constant-voltage signal, a first pair of leads coupled between said oscillator and said primary coil, a first capacitor means connected across said leads for tuning said primary coil to resonance, a phase sensitive demodulator, a second pair of leads coupled between said demodulator and said secondary series-opposed coils, and a second capacitor means connected across said second pair of leads for tuning said secondary coils to a resonant frequency slightly higher than the frequency of said oscillator, said primary coil being normally positioned in a null position with respect to said secondary coils, whereby when said slidable shaft is displaced axially within said housing said demodulator will provide an accurate indication of such displacement.

2. The system set forth in claim 1, wherein a first capacitor is connected in series between said demodulator and said secondary coils, and a second capacitor is connected in series between said oscillator and said primary coil, said first and second capacitors serving as high-pass filters and for blocking lower frequency currents which may be induced by time-varying ambient magnetic fields.

3. The system set forth in claim 1, wherein said non-magnetic housing is a non-magnetic metal.

4. The system set forth in claim 1, wherein said first capacitor means comprises a first pair of fine and coarse tuning capacitors, and said second capacitor means comprises a second pair of fine and coarse tuning capacitors.

* * * * *